United States Patent [19]

Hirshman et al.

[11] Patent Number: 5,324,846

[45] Date of Patent: Jun. 28, 1994

[54] PARTIAL ESTERS OF EPOXY CONTAINING COMPOUNDS

[75] Inventors: Justin L. Hirshman, East Brunswick; Dana S. Garcia, Plainsboro, both of N.J.; Mohammad R. Kazemizadeh, Owatonna, Minn.

[73] Assignee: Elf Atochem North America, Inc., Philadelphia, Pa.

[21] Appl. No.: 828,220

[22] Filed: Jan. 30, 1992

[51] Int. Cl.$^5$ ............................................. C07C 59/185
[52] U.S. Cl. ..................... 554/121; 554/30; 554/149; 554/170; 554/213; 554/227
[58] Field of Search ............... 554/227, 121, 149, 150, 554/224, 170, 30, 213

[56] References Cited

FOREIGN PATENT DOCUMENTS 50-143456 12/1975 Japan .
58-40581 9/1983 Japan .

OTHER PUBLICATIONS

Sarvetnick, Polyvinyl Chloride, Van Nostrand Reinhold Co., pp. 124–127, 1969.
Fatty Acids, Their Chemistry, Properties, Productions and Uses, Krieger Publishing Co., pp. 873–885, (1983).

*Primary Examiner*—José G. Dees
*Attorney, Agent, or Firm*—Stanley A. Marcus

[57] ABSTRACT

The present invention relates to a partial ester derived from the reaction product of an oxirane containing acid or derivative thereof, and a reactive hydroxyl compound selected from the group consisting of diols, triols, di-diols and 1,4-dihydroxy butane and a halogen containing polymer compositon thereof. The oxirane compound can be derived from the group consisting of epoxidized vegetable oil, epoxidized fish oil, an aliphatic or arylaliphatic containing craboxyl compound having an oxirane group in the aliphatic chain.

22 Claims, No Drawings

PARTIAL ESTERS OF EPOXY CONTAINING COMPOUNDS

BACKGROUND OF THE INVENTION

1. Field of the Invention

This invention relates to compounds containing a partial ester of an oxirane (epoxy) group and related halogen-containing polymer compositions, preferably poly(vinyl halide) compositions; and more particularly, this invention relates to partial esters of oxirane compounds in stabilized poly(vinyl chloride) (PVC) compositions.

2. Description of Related Art

Many halogen containing polymers and copolymers are thermoplastic in nature and require heating in order to fabricate them in operations such as molding, calendering, and extruding. The heat with which these polymers are processed is usually in the range of 140° C. to 250° C., and more typically 150° C. to 225° C. and is limited in degree and duration by their tendency to deteriorate and decompose. Decomposition of the polymers leads to deterioration of the resultant physical properties of the resin. In addition, a severe darkening in color of the resin results which prohibits its use in lightly colored or transparent articles. This deterioration and decomposition is a major drawback to the use of poly(vinyl chloride) resins in many applications. In order to overcome this deficiency thermal stabilizers, lubricants and processing aides are employed with halogen containing vinyl polymers.

Sarvetnick, *Polyvinyl Chloride*, Van Nostrand Reinhold CO., pp. 124-127, 1969, discloses the use of both external and internal lubricants in PVC. The main purpose of a lubricant compound is to facilitate processing and permit control of processing rate. External lubricants cause lubricity between the composition and metal surfaces of molds and processing equipment. Internal lubricants affect the frictional properties of resin particles in the composition during processing, thus enabling the compounder to maintain control over the fusion rate of the resin. Most lubricants exhibit both internal and external properties; however some are quite specific. Stearic acid and metal stearates are most commonly used. Other lubricants employed include petroleum based waxes, mineral and vegetable oils, low molecular weight polyethylene, amide and ester waxes, and silicone oils. Metal stearates such as lead, barium, cadmium, and calcium may be used for the dual purpose of stabilizing and lubrication. Lubricants are typically used in the range of from 0.25 to 1.0 percent.

In general, stabilizers fall into three main classes, metal soaps, organic chemicals, and organometallic compounds. Vinyl halide polymer compositions typically contain one or more metal-containing heat stabilizers. Metal-containing stabilizers include compounds where the metal is lithium, sodium, potassium, magnesium, calcium, zinc, strontium, cadmium, barium, manganese, iron, cobalt, titanium, aluminum, tin, lead, bismuth or antimony, or a mixture of any two or more such metal-containing compounds The use of many of these metal-containing compounds as PVC stabilizers is described in British Patent Specification 1,001,344 and an article by Robert G. Weiler, "*Uncommon Metals as Heat Stabilizers for Flexible Vinyl*", pages 534-537, Volume 28, Technical Papers, Society of Plastics Engineers, Inc., 1982.

Organotin compounds, particularly those having tin bonded to sulfur, such as those which contain a mercapto group, have been found to be an extremely effective type of stabilizer for halogen containing polymers, such as poly(vinyl chloride) polymers. A continuing goal of the fabricator is to reduce the cost of the compositions but obtain equal or better heat stability properties. This may be achieved with lower usage of more efficient organotin stabilizers but they still are relatively expensive. Another approach is to replace at least a portion of the tin present in a given resin formulation with a less expensive material, e.g., by addition of less expensive synergistic additive compounds.

Other well-known metal-containing heat stabilizers for vinyl halide polymers include compounds of the elements of Groups IIA and IIB of the Periodic Table of the Elements, as well as compounds of tin, lead, bismuth and antimony. Conventional well-known heat stabilizers for vinyl chloride polymers are also discussed in Chapter 9 of *The Encyclopedia of PVC*, edited by L. I. Nass (M. Dekker, New York 1976).

Japanese Patent, JP 75-143456 discloses a stabilized composition of a halogen resin containing a reaction product of a trihydric alcohol or greater and an epoxidized fatty acid ester. The composition contains at least one metallic salt which can be organotin or Group IIa metal stabilizing compound. While not identifying the structure of the reaction product, the Japanese reference discloses that the compound can be synthesized in water or in a water soluble organic solvent with an inorganic acid or alkaline catalyst. This would be expected to result in significant hydrolysis or saponification of the ester and possibly cleavage of the epoxy group. Therefore, the composition of the reaction products is not apparent

SUMMARY OF THE INVENTION

The present invention relates to a partial ester derived from the reaction product of an oxirane containing acid or derivative thereof, and a reactive hydroxyl compound selected from the group consisting of diols, triols, di-diols and 1,4-dihydroxy butane. Preferred diols are 1,2-dihydroxy alkane compounds. The oxirane compound can be derived from the group consisting of epoxidized vegetable oil, epoxidized fish oil, an aliphatic or arylaliphatic containing compound having an oxirane group in the aliphatic chain. The aliphatic or arylaliphatic compound preferably has at least four carbons in an aliphatic chain. Most preferred hydroxyl compounds are aliphatic diols and glycerol. The partial ester of the present invention is produced under substantially anhydrous conditions by "alcoholysis under anhydrous conditions, i.e., Markley et al., *Fatty Acids, Their Chemistry, Properties, Production and Uses.* Krieger Publishing Co., pp 873-885, (1983). The compounds of the present invention exhibit a thermal change between 135° C. and 200° C., as measured by Thermal Gravimetric Analysis (TGA). TGA was conducted at a heating rate of 10° C. per minute, under air or nitrogen with a sample size of from 5 to 10 mg.

For the purpose of the present invention the term "partial ester" is defined as a partially esterified polyhydroxy compound, i.e., an esterified hydroxyl containing compound wherein one hydroxyl of the diol or not more than two hydroxyls of the triol are esterified. In the di-diol not more than three of the four hydroxyl groups are esterified and preferably only two. Preferably the ratio of esterified hydroxyl groups to free (unesterified hydroxyl groups in the product is greater than 1:2 and preferably from 1:2 to 3:1, and more preferably from 1;2 to 2:1, and most preferably the average hydroxyl content per molecule is greater or equal to 1.5 times the esterified hydroxyl groups.

The terms diol and triol are alcohols containing respectively two and three hydroxyl groups. A di-diol is a compound containing two pairs of hydroxyl groups.

The term "oxirane compound" is defined as a compound having at least one epoxy (oxirane) group per carboxyl group (—COO). Preferred sources of epoxy containing carboxy compounds include epoxidized vegetable oil, epoxidized fish oil, including ester derivatives thereof, and compounds having the formula

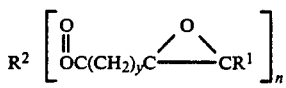

wherein
y=2 to 24, preferably 7 to 24, and
n=1-2

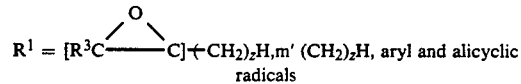

$m=0$ to 2
$z=1$ to 23

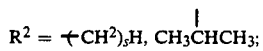

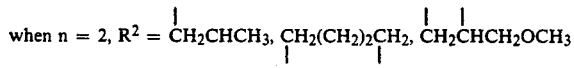

s=1-3
$R^3=(CH_2)_o$, and
o=2 to 8, preferably 2 to 4.

The polyhydroxyl containing compounds are preferably low boiling compounds and contain from 2 to 4 hydroxyl groups per molecule.

Useful diols (dihydroxy compounds) are selected from the group consisting of 1,2-propanediol, 1,2-butane diol, 1,2-pentane diol, 1,2-hexanediol, 1,2-dihydroxy,4-methoxy butane, 1,2-dihydroxy,3-methoxy propane, 1,2-dihydroxy, -3-ethoxy propane and 1,4-dihydroxy butane.

Useful polyhydroxy compounds having at least three hydroxyl groups are selected from the group consisting of glycerol, 1,2,4-trihydroxy butane, 1,2-dihydroxypropyl 3-oxyethanol, 1,2-dihydroxy-propyl-3-oxypropanol-1, di-propylene glycol ether, and 1,2,5,6-tetrahydroxy hexene, bis(1,2 dihydroxy-propyl)X, wherein X is selected from the group consisting of —O—, $SO_2$, OC(O)O, $CH_2C(O)CH_2$, S(O), $C_6H_6$, and $C_6H_{12}$ and the diglycol of bisphenol A, with glycerol preferred.

The present invention includes halogen containing polymer compositions comprising the above described partial ester, and preferably one or more heat stabilizers, lubricants and other additives which facilitate processing the polymer or improving its properties. The halogen containing polymer is preferably poly(vinyl) halide, more preferably poly(vinyl) chloride, or copolymers or blends of poly(vinyl) chloride that are available commercially. The poly(vinyl) chloride composition of the present invention can be rigid or semi-rigid. Such compositions contain up to 15%, and typically 3–15% by weight of a plasticizer such as dioctylphthalate.

The composition preferably comprises a metallic based stabilizer, preferably a stabilizer selected from the group consisting of organometallic and/or metalloorganicmetal metal salts, wherein the metal cation of the organometallic is based on Group IVa and Va and the metallo-organic compounds is based on metals selected from Groups Ia, IIa, IIb, and IIIa, of the Periodic Table of Elements. There is preferably from 0.01 to 10, preferably 0.05 to 5, more preferably 0.1 to 2.0 percent based on the halogen containing polymer of at least one stabilizer.

Tin based stabilizers are preferred in the composition of the present invention and can include organotin stabilizers with preferred stabilizers being mercaptide and mercaptoester based stabilizers. Particularly preferred tin based stabilizers include at least one stabilizer selected from the group consisting of dialkyltin dimercaptide, or monoalkyltin trimercaptide or mixtures thereof. The mercaptides may be mercaptoacid esters, mercaptoalkanol esters, or aliphatic mercaptans or their mixtures, and may include sulfur bridged tin structures. Most preferred are mixtures of mono and dialkyltin mercaptoesters and sulfur bridged tin structures.

Typically, compositions contain from 0.05 to 5.0, preferably 0.1 to 2.0, and more preferably 0.3 to 1.5 percent by Weight or parts per hundred of resin, i.e., phr of a tin based stabilizer.

The use of tin based stabilizers is well-known, they are expensive compared to simple metal stabilizers but offer improved thermal protection and processing during fabrication. In accordance with the present invention, the addition of the partial ester to the composition of the present invention can improve the thermal stability properties and can reduce the amount of the tin stabilized required. Significant reductions of the tin stabilizer are possible, up to 30%, with no loss in stabilization by the use of the partial ester and small amounts of Group IIa and IIb metal carboxylates, optionally with small amounts of polyvinyl alcohol.

Preferred halogen containing polymers which exhibit superior melt stabilization are poly(vinyl chloride) and chlorinated poly(vinyl chloride) with rigid poly(vinyl chloride) homopolymers being most preferred. The halogen containing polymers can include copolymers with vinyl acetate, vinylidene chloride, styrene, dialkyl fumarate or maleate, or other alkyl esters of mono-olefinic acids, as well as blends and alloys with other thermoplastic resins. The halogen containing polymer preferably includes polyvinyl halogen polymer and more preferably the poly(vinyl chloride), although others such as the bromide or fluoride may be used. Also included are halogenated polyolefins.

DESCRIPTION OF THE PREFERRED EMBODIMENTS

The present invention relates to a partial polyol ester of epoxy containing acids and a polymeric composition comprising the partial ester. The partial ester is derived from the reaction of an oxirane containing compound having at least one carboxyl group, and a hydroxy containing compound selected from the group consisting of aliphatic diols, 1,4-dihydroxy butane, triols and di-diols. Preferably, the diols and triols useful in this invention have adjacent hydroxyl groups where at least one hydroxyl is located on the number one (or primary) carbon and the adjacent hydroxyl is secondary. Alternatively, the diol can have two primary hydroxyls separated by two methylene groups. Preferred triols have at least two adjacent carboxyl groups with at least 1 hydroxyl group on a carbon at the one position. Glycerol is a preferred triol. Preferred di-diols useful in the present invention have adjacent diol pairs with each pair containing a primary and secondary hydroxyl. The partial ester of the present invention can enhance the performance of the primary stabilizer. The partial ester also can function as the internal lubricant and can be used in place of the conventional lubricant.

The oxirane compound useful in the present invention is an organic compound comprising at least one epoxy group in the aliphatic chain and at least one carboxyl group. The oxirane group can be prepared by epoxidation of an ethylenic group by any suitable epoxidation technique, such as reaction with a peracid or an in situ generated peracid via hydrogen peroxide and an aliphatic acid such as formic or acetic acid as known in the art. The carboxylic acids preferably contain at least 12 carbons and more preferably 18-24 carbons but not more than 28 carbon atoms per oxirane unit. Useful compounds include epoxidized vegetable oil, epoxidized fish oil, and aliphatic or arylaliphatic carboxylic acids or esters having at least one oxirane group in the aliphatic chain. The epoxy containing aliphatic or arylaliphatic acids or esters contains at least 8 carbons in the aliphatic chain and preferably at least 12, and more preferably 12 carbons up to 28 carbons. The oxirane content of the partial ester of the diol of the present invention should be at least 3, and preferably 4 and more preferably at least 5 percent by weight. Typically, the compound may have up to 10 percent by weight of oxirane.

It is recognized that naturally occurring sources of unsaturated aliphatic acid group, such as vegetable or fish oils, also contain saturated acid groups. Upon epoxidation of these vegetable or fish oils to produce the epoxy containing oil, the saturated acids moieties will remain intact and be present in the partial ester compositions of the present invention. The resulting saturated acid partial esters that are present in the mixture are inert. They behave as diluents and, therefore, vegetable or fish oils, which are used as sources for the epoxidized oils preferably contain less than 20 percent saturated acids.

Preferred oxirane compounds include epoxidized vegetable oil, epoxidized fish oil and compounds having the formula $$R^2 \left[ \begin{matrix} O \\ \| \\ OC(CH_2)_yC \end{matrix} \overset{O}{\underset{}{\triangle}} CR^1 \right]_n$$

wherein
y=2 to 24, preferably 7 to 24, and
n=1-2

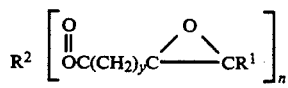
$R^1 = $ +R$^3$C————C](CH$_2$)$_z$H$_m$(CH$_2$)$_z$H, aryl and alicyclic radicals m=0 to 2 z=1 to 23

$R^2 = $ +CH$^2$)$_s$H, CH$_3$CHCH$_3$;

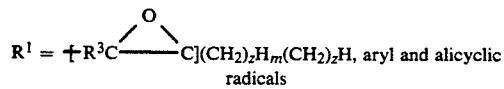
when n = 2, R$^2 = $ CH$_2$CHCH$_3$, CH$_2$(CH$_2$)$_2$CH$_2$, CH$_2$CHCH$_2$OCH$_3$ s=1-3
R$^3$=(CH$_2$)$_o$, and
o=2 to 8, preferably 2 to 4.

Preferred oxirane compounds include epoxidized vegetable oil and epoxidized fish oil with the epoxidized vegetable oil selected from soy bean, linseed, corn, safflower, sunflower, rapeseed, peanut, cotton, castor and the like. Preferred compounds also include epoxidized methyl oleate and epoxidized methyl linoleate.

Useful polyhydroxyl compounds include diols, triols, and di-diols. Preferably at least one of the hydroxyls are located on the 1-carbon with an adjacent hydroxyl secondary to the primary hydroxyl. Diols can have two primary hydroxyl separated by at least two but no more than four methyl groups. Useful triols include glycerol 1,2-dihydroxy propyl-3-oxyethanol, and 1,2-dihydroxy-propyl-3-oxypropanol. Also useful are di-diols which have four hydroxyl compounds. By di-diols it is meant that there are adjacent diol pairs located at the ends of a hydrocarbon chain. The diol pairs are separated by at least two and preferably up to four methylene groups.

Preferred diols are compounds selected from the group consisting of propylene glycol, 1,4-butane diol, 1,2-butane diol, and propylene diol. The most preferred triol is glycerol.

The diols, or di-diols of the present invention having at least two methylene groups separating the pairs of diols can additionally have neutral atoms in the bridging chain. Such neutral atoms can include ether groups such as methoxyl, ethoxyl, butoxyl groups. The di-diols can also have neutral groups between pairs of diols. Bridging groups include —O—, SO$_2$, OC(O)O, CH$_2$C(O)CH$_2$, S(O), C$_6$H$_6$, and C$_6$H$_{12}$. Useful di-diols preferably have from 6 to 12 carbon atoms.

Useful polyhydroxy compounds having at least three hydroxyl groups are selected from the group consisting of glycerol, 1,2,4-trihydroxy butane, 1,2-dihydroxy-propyl-3-oxyethanol, 1,2-dihydroxy-propyl-3-oxy-propanol-1, di-propylene glycol ether, and 1,2,5,6-tetrahydroxy hexene, bis(1,2 dihydroxy- propyl)X, wherein X is selected from the group consisting of —O—, SO$_2$, OC(O)O, CH$_2$C(O)CH$_2$, S(O), C$_6$H$_6$, and C$_6$H$_{12}$ and the diglycol ether of bisphenol A, with glycerol preferred. A useful compound is 1,2-propyl-3-oxy-1',2'-dihydroxy propane (dipropylene glycol ether).

The partial epoxidized esters can be prepared by conventional methods known in the art. Such methods include esterification, trans-alcoholysis or trans-esterification. The preferred method is trans-alcoholysis by diol, di-diols or triol of a methyl ester of an epoxidized acid, or triglyceride of epoxidized soy bean, linseed or other oil as are commercially available. When an epoxidized oil is reacted with a diol, di-diol, or triol and glycerol, a mixture of partial esters of glycerol and the diol, or di-diols or triol is obtained. There can be up to approximately 30 percent by weight and preferably from 1 to 15 percent by weight of the fully esterified product present in the mixture of epoxidized oil.

The partial ester of the present invention is useful in a polymeric composition. Preferred polymers are halogen containing polymers, most preferably poly(vinyl halides). The partial ester of the present invention provides internal lubrication as well as co-stabilization.

In general, halogen containing polymers are vinyl halide polymer compositions including homopolymers of vinyl halide monomers, copolymers of vinyl halide monomers with other monomers and including both block and graft copolymers, and alloys, blends and mixtures of vinyl halide polymers with other polymers.

Preferred halogen-containing polymers include poly(vinyl halides), preferably poly(vinyl) chloride, chlorinated poly(vinyl) chloride, and copolymers, as well as blends and alloys of vinyl halide polymers with other thermoplastic resins. Useful polymers in the composition of the present invention include: copolymers of vinyl chloride with a copolymerizable ethylenically unsaturated monomer such as styrene, vinylidene chloride, vinyl acetate, vinyl butylate, vinyl benzoate, diethyl fumarate, diethyl maleate, other alkyl fumarates and maleates, vinyl propionate, methyl acrylate, 2-ethylhexyl acrylate, butyl acrylate, ethyl acrylate and other alkyl acrylates, methyl methacrylate, ethyl methacrylate, butyl methacrylates, hydroxy-ethyl methacrylate and other alkyl methacrylates, methyl alpha chloroacrylate, styrene, vinyl ethers such as vinyl ethyl ether, vinyl chloroethyl ether, vinyl phenyl ether, vinyl ketones such as vinyl methyl ketone, vinyl phenyl ketone, trichloroethylene, 1-fluoro-1-chloro-ethylene, acrylonitrile, chloroacrylonitrile, allylidene diacetate, chloroallylidene diacetate, and ethylene and propylene. The poly(vinyl halide) polymer used is ordinarily and preferably the chloride, although others such as the bromide or fluoride may be used. The preferred polymer is a rigid homopolymer of poly(vinyl chloride).

Polymer blends useful in the practice of this invention comprise physical blends of at least two distinct polymeric species. The composition comprises a matrix or continuous phase of the halogen containing polymer. Preferably the polymeric material in the composition comprises from 40 weight percent of the halogen containing polymer. Of course the composition of the present invention includes embodiments where the polymeric material is 100 percent of the halogen containing polymer. Polymer blends include blends of: poly(vinyl chloride) and poly(ethylene), poly(vinyl chloride) and poly(methyl methacrylate), poly(vinyl chloride) and poly(butyl methacrylate), poly(vinyl chloride) and polystyrene; poly(vinyl chloride) and acrylonitrile-butadiene-styrene copolymer, and poly(vinyl chloride) and poly(methyl methacrylate).

The benefits of this invention preferably apply to rigid and semi-rigid halogen-containing polymers. For the purpose of the present invention "rigid" polymers are considered to be polymer compositions which contain substantially no plasticizer. Reference is made to Billmeyer, *Textbook of Polymer Science.* 2d Ed., page 420, for the accepted definition of the term "rigid". The vinyl halide polymers can be compounded for extrusion, blow molding and calendering, and can be formed into such finished articles as fibers, wire and cable, siding, window profiles, pipe, film, sheets and bottles. The vinyl halide polymers can be mixed with other ingredients such as dyes, pigments, flameproofing agents, internal and external lubricants, impact modifiers, and processing aids, and with other additives to prevent, reduce or mask discoloration or deterioration caused by heating, aging, exposure to light or weathering.

The composition can also be used with semi-rigid halogen containing polymers. The compositions of the present invention can include up to about 15 weight percent of one or more plasticizers including those referred to in Billmeyer at page 421, and in *Modern Plastic Encyclopedia,* 1979, McGraw Hill at pages 106, 212 and 685-695, which are useful with halogenated polymers. Useful plasticizers include, but are not limited to, phthalate esters, as well as adipates, azelates, phosphates, and epoxidized vegetable oil. A commonly used plasticizer is di(2-ethylhexyl) phthalate (DOP). Other useful plasticizers include tricresyl phosphate, dibutyl phthalate, dibutyl sebacate, tributyl phosphate, epoxidized esters, dioctyl phthalate, trioctyl phosphate, dioctyl sebacate and adipate, and various low-molecular weight polymers such as poly(propylene glycol) esters are now widely utilized as plasticizers for the vinyls.

The compositions can contain one or more metal-containing heat stabilizers. Metal-containing stabilizers including compounds where the metal is lithium, sodium, potassium, magnesium, calcium, zinc, strontium, cadmium, barium, tin, bismuth or antimony, or a mixture of any two or more such metal-containing compounds. The use of many of these metal-containing compounds as PVC stabilizers is described in British Patent Specification 1,001,344.

The present invention includes stabilizers selected from the group consisting of organometallic, metallo-organic compounds wherein the metal in the organic compounds is selected from the periodic groups Ia, IIa, IIb, IVa, and Va. The most preferred stabilizers are tin based stabilizers with organotin compounds especially preferred. For the purposes of the present invention organometallic compounds are compounds wherein there is at least one metal atom bonded to a carbon atom. By metallo-organic compounds it is meant that the compound contains at least one metal compound indirectly bonded to a carbon through a connecting atom such as sulfur, oxygen or other connecting atoms. Useful metallo-organics, soaps and inorganic salts other than tin include, but are not limited to, antimony tris-(isooctyl mercaptoate). The metal com- ponent of said metallo-organic compound can include lithium, sodium, potassium calcium, magnesium, zinc, tin, antimony and mixtures thereof. Useful metallo-organic compounds include mono carboxylate salts and phenolates, mercaptides and mercaptoesters of antimony, bismuth and mixtures thereof.

The organotin compounds represent an especially well-known and widely used class of metal-containing heat stabilizers for vinyl halide polymers. Included within the class of useful organotin compounds are those containing one or more tetravalent tin atoms each of which have at least one direct tin-to-carbon bond. Such compounds are described tcin U.S. patents and other references. The stabilizer used is preferably substantially non-volatile at ordinary processing temperatures, namely, 150° C., and dispersible in the selected vinyl resin, that is, compatible to the extent that it may be compounded with the resin in compounding operations that are used in this industry.

A useful class of tin-containing heat stabilizers are compounds containing one or more tetravalent tin atoms which each have at least one direct tin-to-sulfur or tin-to-oxygen bond, that is, which contain a group:

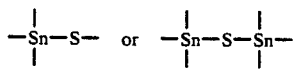

or

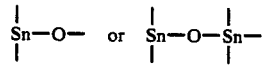

Examples of such compounds with tin-to-sulfur bonds are described in U.S. Pat. No. 3,764,571, issued to Jennings, and examples of compounds with tin-to-oxygen bonds are described in U.S. Pat. No. 3,167,527, to Hechenbleikner et al.

Organotin compounds include those containing one or more tetravalent tin atoms having at least one direct tin to carbon bond and wherein the remaining valences of the tin atom are satisfied by bonds to either oxygen, sulfur as a residue resulting from removal of the hydrogen atom from the sulfur atom of a mercaptan, mercaptoacid, mercaptoalcohol, mercaptoacid ester or mercaptoalcohol ester or a residue resulting from removal of the hydrogen atom from the oxygen atom of a carboxylic acid or alcohol or halogen acid with the provision that at least one valence site is oxygen or sulfur or mixture thereof. Organotin compounds include di and mono methyltin mercaptide, butyltin mercaptide, octyltin mercaptide, auryltin mercaptide, ester tin mercaptide, and the reaction product if an organotin halide with alkaline metal sulfide and mercaptide, mercaptoacid esters, mercaptoalcohols, or mercaptoalcohol esters or mixtures thereof. Other tin compounds include mono and di organotin mercaptides, halogen containing sulfur or oxygen bridged organotin mercaptides, alkyltin carboxylates, and organotin alkoxides. The organotin compounds include an organotin chloride/organotin mercaptide combination or an alkyl chlorotin carboxylate. However, when the alkyl tin maleates have been found to be ineffective in obtaining improved stabilization with the PVC compositions of the present invention.

Tin compounds can be used alone or in combination, in the form of mixtures that react in situ, as described in U.S. Pat. No. 3,674,737 to Brecker, in the form of mixtures as described in U.S. Pat. No. 4,255,320 to Brecker and as blends as described in U.S. Pat. No. 4,576,984 to Bresser et al.

In addition, the tin compounds, mixtures, blends and the like referred to above can be used in combination with an organotin halide as disclosed by Larkin in U.S. Pat. 3,715,333.

The tin based stabilizers useful herein are well known for their ability to prevent formation of, or react with and neutralize, the hydrogen halide evolved when vinyl halide polymers are heated to processing temperatures. The progressive elimination of hydrogen halide from the polymerization chain ("unzipping") yields a polyene chain which is believed to be at least partially responsible for the change in viscosity and color that occurs during heating of the polymer.

Preferred tin compounds are those containing one or more tetravalent tin atom each of which has at least one direct tin-to-sulfur bond and may include a bond and include the organotin oxides, sulfides, mercaptides, derivatives of mercaptoalcohols and the mercaptoacid and mercaptoalcohol esters. They can be represented by the following formula:

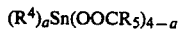

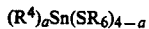

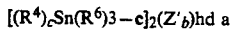

where a is 1 or 2;
x is an integer from 3 to 20, inclusive;
Z is oxygen or sulfur;
Z' is oxygen or sulfur;
b is an integer from 1 to 4 when Z' is
sulfur and is 1 when Z' is oxygen;
c is 1 or 2:
$R^4$, $R^5$ and $R^6$ each independently is substituted or unsubstituted hydrocarbyl, but $R^5$ is not unsaturated.
and $R^6$ additionally can be
—$R^7$—$COOR^8$ or —$R^9$—$OOCR^8$,
(where $R^7$ is $C_1$-$C_{20}$ alkylene),
or $R^6$ can be H;
$R^8$ is hydrocarbyl; and
$R^9$ is $C_2$-$C_{20}$ alkylene.

Preferred tin-containing compounds include the reaction product of a mono-organotin trihalide, a diorganotin dihalide, or mixture thereof, with an alkali-metal sulfide and one or more of a monocarboxylic acid, a polycarboxylic acid, and more preferably a mercaptan, a mercaptoacid, a mercaptoalcohol, a mercaptoacid ester or a mercaptoalcohol ester.

More preferred tin stabilizers are bridged mercaptide compounds. Preferred sulfur-bridged compounds nominally are represented by the formula

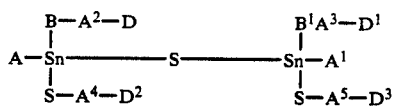

where:
A and $A^1$ are alkyl of 1 to 12 carbon atoms, preferably methyl, butyl and octyl;
$A^2$, $A^3$, $A^4$ and $A^5$ are lower alkylene having the formula —$(CH_2)n$—
wherein n is from 1 to 18, with an n of 1 or 2 preferred;
B and $B^1$ are selected from S, O, A and A';
D, $D^1$, $D^2$ and $D^3$ each, independently are selected from
OH,

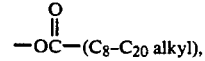

($C_6$-$C_{18}$) alkyl, or

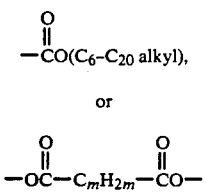

where m is a number from 1 to 8.

Although these compounds are described by the above structure, they often exist in equilibrium mixtures of two or more compounds, typically, organotin sulfide, and organotin mercapto compounds.

A preferred group of the tin stabilizer compounds are sulfide containing tin mercaptide-type stabilizer. These compounds contain

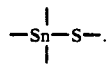

Examples of the stabilizers which fall under the first category include, sulfide containing mercaptides, such as alkyl tins (the alkyl groups are $C_1$ to $C_{18}$ individually and in combination), mercaptoester tins individually and in combination.

Useful tin mercaptide type stabilizers include monobutyltin(isooctylmercaptoacetate)sulfide, monobutyltin (dodecylmercaptide)sulfide, monobutyltin (mercaptoethyloleate)sulfide, monobutyltin trimercaptoethyloleate, monobutyltin(hydroxyethylmercaptide)sulfide, monobutyltin (mercaptoethyloleate sulfide, dioctyltin bis(isooctylmercaptoacetate), and

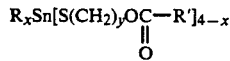

where
$x = 1$ or 2
$y = 1$ to 18
$R$ = alkyl group $C_1$–$C_{12}$
$R'$ = alkyl group $C_1$–$C_{18}$ Also useful are tin tetramercaptides such as tin tetra isooctyl mercaptoacetate and dibutyltin dilaurate.

Non-sulfur tin compounds which can be utilized as stabilizing materials alone, or in combination, are organotin carboxylates, or organotin alkoxides.

Tin stabilizer compositions of the present invention include combinations of any of the above compounds. The compositions can be made by individually mixing the stabilizers together, or to actually form two or more of the above-identified stabilizing compounds together in an in situ chemical synthesis. Specific examples of useful tin compounds as listed in Japanese Reference 62-23 6846, hereby incorporated by reference.

Typically, compositions contain from 0.05 to 5.0, preferably 0.1 to 3.0, more preferably 0.3 to 2.0, and most preferably 0.5 to 1.5 percent by weight (or parts per hundred of resin, i.e., phr) of a stabilizer, preferably tin based stabilizer based on the weight of the polymer.

The tin stabilizer compound performs the function of preventing decomposition of the polymer during the processing procedure. The stabilizer allows the polymer itself to be molded, calendered or extruded without any type of discoloration or deterioration of the resin itself.

A major disadvantage of the use of any of the above-identified organotin stabilizer compositions is the cost associated therewith. A reduction of the amount of tin stabilizer, would be extremely beneficial in that it will make the use of such stabilizing compounds or compositions a major cost-saving feature for the user.

There can be from 0.05 to 10, preferably 0.1 to 3, more preferably 0.2 to 2.5 percent based on the halogen containing polymer of at least one Group Ia IIa, or IIb metallic carboxylate salt. Some of these Group II metal salts can function both as a stabilizer and an internal lubricant. The metal carboxylic salts useful in the present invention contain at least one carboxylic acid or derivative thereof selected from carboxylic acids having at least two carboxyl groups, at least one carboxyl group and at least one hydroxyl group, at least one carboxyl group and at least one mercaptan and aromatic carboxylic acids or derivatives thereof having at least one carboxyl group.

A particularly preferred composition of the present invention comprises poly(vinyl chloride) or chlorinated poly(vinyl chloride). A preferred organotin compound, can include alkyl (mercapto)tin and alkyl (mercapto)ester tin compounds in an amount (based on elemental tin) of about 0.04 to 0.8 percent based on the weight of polymer. There is about 0.1 to 10.0, preferably, 1 to 10, and more preferably 1 to 8 percent based on the weight of the polymer of the partial ester of the present invention.

The compositions of this invention can also contain one or more conventional additives, including mold release agents, colorants, including dyes and pigments, anti-oxidants, flame-retardants, fibrous and particulate fillers and reinforcements, plasticizers, impact modifiers, process aides and the like.

The compositions are typically physically mixed. The components can be mixed in powder blending equipment such as a ribbon blender or Henchel mixer, typically at room temperature. Various of the additives, including the partial ester of the present invention, can be added individually or in combination. The temperature may rise due to the heat of mixing. The mixed composition can then be melt processed such as extruding, pelletizing, calendering and the like. The compositions of this invention can be melt blended in a suitable melt blender such as a screw extruder, or other conventional plasticating devices such as a Brabender ®, Banbury mixer, mill or the like.

The composition can be melt blended at a temperature greater than the melt temperature of the highest melting point polymer. Preferably, the composition is melt blended at a temperature at least 10° C. greater than the melt temperature of the highest melting point polymer in the composition, and less than the temperature at which there is significant degradation. More preferably the composition is made by melt blending at from 10° C. to 75° C., and yet more preferably 10° C. to 30° C. above the melt temperature of the melt temperature of the poly(vinyl chloride) in the composition. Typical temperatures range from 150° to 250 C.

The compositions can be made into a wide range of useful articles by conventional methods employed in the fabrication of thermoplastic articles, i.e., as molded parts, extruded shapes, e.g., tubing, films, sheets, fibers laminates and wire coating. "Molding" means forming an article by deforming the blend in the heated plastic state.

EXAMPLES

The following examples illustrate the practice of the present invention. The examples should not be construed as limiting the invention to anything less than that which is disclosed or which would have been obvious to one of ordinary skill in the art therefrom. Parts are parts per hundred parts of resin (phr), and percents are weight percent unless otherwise indicated. Molecular weights are weight average molecular weights unless otherwise indicated. The following Table is a generic description/use of materials of the Examples.

TABLE

| Common Name | Description/use | Supplier |
| --- | --- | --- |
| Thermolite ® T890 | Dioctyltin mercaptoester stabilizer | Atochem |
| Durastrength ® D200 | acrylic copolymer impact modifier | Atochem |
| A-C 629 | Oxidized polyethylene wax lubricant | Allied-Signal |
| Metalblen ® P550 | Acrylic copolymer processing aid | Atochem |
| Toner | blue pigment colorant | various |
| Vikoflex ® V7170 | Epoxidized soybean oil/raw material | Atochem |
| Mark ® 557B | Magnesium-zinc mixed metal stabilizer | Witco |
| Caster Wax | Caster Oil derived wax lubricant | Caschem |
| ESO | Acronym for epoxidized soybean oil | |
| GMS | Glycerol monostearate | |
| Thermolite ® T108 | Butyltin mercaptoester stabilizer | Atochem |
| Loxiol ® G70S | Ester type wax lubricant | Henkel |
| XL165 | Paraffin wax lubricant | Hoechst-Celanese |
| Thermolite ® T176 | Butyltin mercaptoester stabilizer | Atochem |
| Metablen ® C201 | Methacrylate-butadiene-styrene (MBS) impact Modifier | Atochem |
| Metablen ® P501 | Acrylic copolymer processing aid | Atochem |
| Thermolite ® T340 | Butyltin mercaptoester stabilizer | Atochem |
| Thermolite ® CN10302 | Butyltin mercaptoester stabilizer | Atochem |
| DM9802 | Butyltin mercaptoester stabilizer | Atochem |
| Loxiol ® G70 | Ester type wax lubricant | Henkel |
| Loxiol ® 711 | Ester type wax lubricant | Henkel |
| PVA | Polyvinyl acetate | various |
| Metalblen ® P710 | Acrylic copolymer lubricant-process aid | Atochem |
| Thermolite ® T176 | Butyltin mercaptoester stabilizer | Atochem |

Following is the typical procedure used for Example PVC Comparative. The PVC supplied by Shintech as 650 and having K=58 value was compounded in a Henchel ® mixer with the indicated stabilizer, lubricant, impact modifier and process aid. Following compounding, the formulations were tested for thermal term stability(decomposition) in a Brabender ® torque rheometer (TR). The term stability was taken from the TR curve at the point where an increase in torque (viscosity) occurs minus the time for resin fusion. In all cases a standard formulation was also tested to obtain the stability value.

Sample to sample reproducibility is 1 minute. An increase in term stability of <2.5 minutes is not considered significant.

In some experiments chips were pulled from the TR mixing bowl at controlled time intervals and the color was evaluated. Comparison of color change as a function of time was used for performance evaluation.

The change in color (formation of color) was evaluated from samples taken from a 2-roll mill at a constant 4 minute time interval. The conditions for mill testing were 360° F. and 25 rpm for the front roll and 360.F and 20 rpm for the back roll. The milled sample thickness was kept at 30 mil.

In the Examples color stability was measured by Yellowness Index and Whiteness Index. A Macbeth Colorometer was used for the Yellowness Index measured according to ASTM D-1925. The higher the number the more yellow the sample. Whiteness index was similarly measured with a higher number indicating a whiter sample. Haze measurements were made according to ASTM D-1003-61 (1977). Haze values and percent light transmission values are reported. The lower the haze value the clearer the sample. Analogously, the higher the percent transmission (%T) the more light is transmitted.

EXAMPLE 1

This Example illustrates the preparation of mono esters of epoxidized soya acid and 1,2-diols from the methyl ester propylene glycol monoester of epoxidized soya acids.

To a 1-liter, three-necked flask fitted with a mechanical stirrer, thermometer, condenser, vacuum take-off and a heating mantle were charged 310g (1.0 mole) of the methyl ester of epoxidized soya acids (Vikoflex ® 1110, Atochem North America, Inc.) 76g (1.0 mole) 1,2-propanediol and as a catalyst 0.7g dibutyltin oxide and 0.3 lithium hydroxide. A nitrogen blanket was maintained during reaction. The mixture was heated to 170° C. with stirring for 3 hours. Approximately 27–30 g of methanol was collected. Vacuum was then applied for 2 hour. The product was cooled to room temperature and washed with two 100 ml portions of water. The washed product was dried under vacuum heating at 120° C. for hour. The yellow, viscous liquid product weighed 332 g (94%). Analysis: Oxirane 5.8% (Calc 6.1), Acid Value ≦0.05.

Similarly prepared were the mono esters of: epoxidized soya acid and 1,3-propanediol, 1,2-butanediol, 1,3-butanediol, 1,4-butanediol, 2,3-butanediol neopentyl glycol, 1 6-hexanediol, 1,5-pentanediol, 2-methyl-1,4-pentane diol, 3-methoxy-1,2-propanediol, glycerol (with 2 mol methyl ester), pentaerythritol (with 2 mol methyl ester), sorbitol (with 3 mol methyl ester) mannitol (with 3 mol methyl ester).

EXAMPLE 2

This Example illustrates the preparation of the epoxidized mono esters of methyl oleate (99%, Aldrich Chemical) and methyl linoleate (99%, Aldrich Chemical).

These esters were epoxidized according to standard procedures by reacting with peracetic acid which was generated in situ by the reaction of hydrogen peroxide (30%) with acetic acid, employing sulfuric acid as a catalyst. The epoxidized methyl esters were washed with water and diluted alkali to remove the acid components.

Following the procedure of Example 1, 0.2 mole of 1.2-propane diol (100% excess) was reacted with 0.1 mole of epoxidized methyl oleate. Analysis of the colorless somewhat viscous liquid product yielded an oxirane contant of 4.68% and an Acid Value 0.05.

Similarly, the epoxidized mono ester of epoxidized methyl linoleate and 1,2-propane diol was prepared. The liquid to semisolid colorless product had an oxirane content of 8.05% and an Acid Value 0.5.

EXAMPLE 3

The glyceryl mono/di esters of epoxidized methyl oleate and epoxidized methyl linoleate similarly were prepared following the procedure of Example 1. 0.1 moles of the epoxidized methyl oleate and the epoxidized methyl linoleate each were reacted with 0.2 mol glycerol (100% excess). Analysis of the solid oleate and liquid to semisolid linoleate resulted respectively in an oxirane content of 4.3% and 7.2% and Acid Values of ≦0.6.

EXAMPLE 4

The mono/di esters of epoxidized soybean oil and glycerol was prepared according to the follow procedure. Into a two liter, 3-necked flask equipped with a condenser, thermometer, vacuum take-off, mechanical stirrer and heating mantle was added 950 g (1 mol) epoxidized soybean oil (Vikoflex 7170, Atochem North America), 184 g (2 mol) 99% glycerol and a solution of 1.25 g potassium hydroxide dissolved in 10 g methanol. Vacuum was applied and the mixture was heated to 150° C. and maintained for 2.5 hours. The mixture was cooled to 90° C. and 1000 g perchlorethylene was added. The solution was washed with 100 ml of 1% acetic acid and 100 ml water. The solvent then was removed under vacuum and the residual oil was steam sparged at 130° C. for 1 hour. The yellow to amber viscous liquid to semisolid weighed 1035-40 g. Analysis: Oxirane content 5.25-5.6%, Acid Value ≦0.8, fatty acid soap ≦100 ppm.

EXAMPLE 5

The mono ester of epoxidized soybean oil and 1,2-propanediol was prepared following the procedure of Example 4. 950 g (1 mol) epoxidized soybean oil (Vikoflex 7170, Atochem North America) and 152 g (2 mol) 1,2-propanediol were reacted at 140° C. The product, a mixture of partial esters of glycerol and 1,2-propane diol and epoxidized soya acids, was a viscous oil weighing 1060-1080 g (96-98% yield). This oil slowly solidified to semi-solid wax upon standing. Analysis: Oxirane 6.1-6.6%, Acid Value ≦0.8, fatty acid salts (soaps) ≦100 ppm.

EXAMPLE 6

This Example illustrates a PVC composition of the present invention.

| Formulation: | | | Test Conditions: | |
|---|---|---|---|---|
| PVC | | 100.00 | | 190° C. |
| Thermolite ® | T890 | 1.80 | | 75 rpm |
| Metablen ® | C201 | 15.00 | | 62 g |
| | AC629 | 0.20 | | |
| Metablen ® | P550 | 2.00 | | |
| | Toner | 0.02 | | |
| | GMS | 1.50 | | |

In this formulation GMS, (glycerol mono stearate), Loxiol ® G12, Henkel, was replaced by the partial ester of epoxidized soybean oil and glycerin at the same level of 1.5 phr.

Table I Illustrates the use of the product of Example 4 as a direct replacement for GMS. The term stability performance was evaluated in terms of the hydroxyl to ester ratio. The results are expressed in terms of the difference in term stability between the formulation containing the

TABLE I

| Hydroxyl/Ester Ratio | Increase in Term Stability Over Control (min) |
|---|---|
| 0.68:1 | 2.0 |
| 0.70:1 | 2.1 |
| 1.00:1 | 6.0 |
| 1.50:1 | 3.75 |

Table II illustrates the long term color hold of a formulation containing the product of Example 4 as compared with GMS control. The chips were obtained from the mill testing procedure as described in the introductory part. The color is evaluated in terms of Y.I. (yellowness index) and W.I. (whiteness index).

TABLE II

| Time (min) | (GMS Formulation) | | (Ex. 4 Formulation) | |
|---|---|---|---|---|
| | Y.I. | W.I. | Y.I. | W.I. |
| 4 | −6.79 | 89.06 | 2.02 | 78.05 |
| 8 | −3.96 | 79.71 | −0.42 | 75.42 |
| 12 | 0.99 | 69.23 | 2.04 | 70.46 |
| 16 | 12.86 | 33.72 | 6.46 | 53.13 |
| 20 | 38.25 | −29.12 | 13.03 | 36.11 |

An alternative approach was to reduce the level of tin stabilizer (T890) in a formulation where Example 4 replaced GMS at 1.5 phr. The results are given in Table III.

TABLE III

| PHR of Thermolite ® T890 | PHR of Ex. 4 | Term Stability (min) |
|---|---|---|
| 1.8 | 0 | 17.0 |
| 1.5 | 1.5 | 18.5 |
| 1.2 | 1.5 | 16.5 |

EXAMPLE 7

In this Example, using the formulation in Example 6, GMS was replaced with the partialester of epoxidized linseed oil and glycerin prepared as described in Example 4. The results are shown in Table IV and illustrate the use of a higher oxirane containing fatty acids.

TABLE IV

| Polyol Partial Fatty Acid Ester (polyol/acid) | Increase in Term Stability Over Control (min) |
|---|---|
| glycerin/epoxidized linseed oil | 4.3 |

EXAMPLE 8 using the formulation in Example 6 the partial esters of epoxidized soya acids and polyols made in Example 1 were evaulated. The results are shown in Table V. The partial esters were prepared via the direct reaction of 1 l mol methyl epoxy soyate with 1 mol of the polyol in the presence of basic catalyst and dibutyltin oxide (DBTO).

TABLE V

| Polyol Reacted with Methyl epoxy soyate | Increase in Term Stability Over Control (min) |
|---|---|
| 1,2 ethanediol | 1.0 |
| 1,2 propanediol | 7.0 |

TABLE V-continued

| Polyol Reacted with Methyl epoxy soyate | Increase in Term Stability Over Control (min) |
|---|---|
| 1,3 propanediol | 0.5 |
| 1,4 butanediol | 3.5 |
| 1,2 butanediol | 5.5 |
| 1,3 butanediol | 0.5 |
| 2,3 butanediol | 2.5 |
| neopentyl diol | 0.5 |
| Pentaerythritol | 0.0 |
| Sorbitol | 1.5 |
| mannitol | 0.5 |
| 1,6 hexanediol | 2.75 |
| 1,5 pentanediol | 2.0 |
| 2 methyl 1- pentane 1,4 diol | 3.0 |
| 3 methoxy 1,2 propanediol | 4.0 |

EXAMPLE 9

Mixed polyol fatty acid mono esters were made from the reaction of epoxidized soybean oil (ESO) with a polyol as made in Example 5. The results are given in Table VI.

TABLE VI

| Polyol Reacted with ESO | Increase in Term Stability Over Control (min) |
|---|---|
| Glycerol (Example 4) | 6.0 |
| 1,2 Propanediol | 8.0 |
| Pentaerythritol | 2.3 |

EXAMPLE 10

The partial glyceryl ester of Example 4 was tested with a variety of organotin mercaptide stabilizers used in bottle and calender formulations. The results are given in Table VII. The stabilizer level was 1.8 phr. As in previous Examples GMS at 1.5 phr was replaced with the product of Example 4 at 1.5 phr. In each case the control is a formulation containing the appropriate stabilizer and GMS.

TABLE VII

| Tin Stabilizer | Increase in Term Stability Over Control (min) |
|---|---|
| Thermolite ® T890 | 6.0 |
| Thermolite ® T108 | 5.0 |
| Thermolite ® DM9591 | 5.5 |

EXAMPLE 11

Using the formulation below the GMS was replaced with the partial ester of Example 4 and the color change (Y.I. and W.I.) was measured on chips obtained from the PVC sheet which was removed from the two roll mill at predetermined time intervals.

| Formulation: | PVC | 100.00 |
|---|---|---|
| Thermolite ® | T890 | 1.80 |
| Metalblen ® | C201 | 15.00 |
|  | AC629 | 0.20 |
| Metalblen ® | P550 | 2.00 |
|  | Toner | 0.02 |
| Metalblen ® | P710 | 1.00 |
|  | GMS | 1.50 |

The results are summarized in Table VIII.

TABLE VIII

| Time (min) | (GMS Formulation @ 1.5 phr) | | | (GMES: Example 4 Formulation @ 1.0 phr) | | |
|---|---|---|---|---|---|---|
|  | Y.I | W.I. |  | Y.I. | W.I. |  |
| 4 | −6.76 | 86.66 | blue/wt | −6.64 | 87.52 | blue/white |
| 8 | −4.41 | 82.63 | " | −4.83 | 83.31 | " |
| 12 | −0.77 | 70.5 | " | −3.02 | 77.01 | " |
| 16 | 6.88 | 49.3 | " | −0.06 | 66.84 | " |
| 20 | 21.98 | 8.26 | " | 0.68 | 66.93 | " |
| 24 | 45.94 | −45.96 | " | 5.54 | 52.45 | " |
| 28 | 73.16 | −82.16 | " | 11.66 | 35.80 | " |
| 36 | 101.37 | −94.60 | brn/blk | 31.38 | −14.87 | dark yellow | brn=brown
blk=black

EXAMPLE 12

Using the formulation in Example 11, where GMS was replaced with the partial ester of Example 4 at 1.5 phr, bottles were prepared on a Bekum blow molding machine. The bottles were then ground and the term stability was measured on the TR. The conditions were:
190° C.
60 rpm
62 g
The results are shown in Table IX.

TABLE IX

|  | GMS Formulation | Example 4, Partial Ester Formulation |
|---|---|---|
| Term Stability (min) | 22.25 | 29.50 |

Haze development was tested in bottles filled with water, Vodka and Vitalis after 35 days at 40° C. The results are shown in Table X.

TABLE X

|  | GMS Formulation | Product of Example 4 Formulation |
|---|---|---|
| Original Values |  |  |
| Haze | 6.7 | 6.2 |
| % T | 87.3 | 87.9 |
| After 35 days at 49° C. |  |  |
| Water Haze | 9.5 | 7.6 |
| % T | 86.7 | 88.7 |
| Vodka Haze | 36.2 | 21.6 |
| % T | 76.9 | 82.7 |
| Vitalis Haze | 43.3 | 46.0 |
| % T | 71.9 | 71.0 |

Haze and %T were determined according to the appropriate ASTM testing protocol, test # ASTM D 1003 as recited.

EXAMPLE 13

Using the formulation in Example 6, the long term color hold of a formulation containing 1.5 phr mono ester of epoxy soya acid and 1,2 propanediol (Example 1) was evaluated on the two roll mill. The results are given in Table XI. The control is a formulation with 1.5 phr of GMS.

TABLE XI

| Time (min) | (GMS Formulation) | | | (our material) | | |
|---|---|---|---|---|---|---|
|  | Y.I | W.I. |  | Y.I. | W.I. |  |
| 4 | −5.84 | 85.96 | blue/white | −4.81 | 82.88 | blue/white |
| 8 | −4.05 | 82.14 | " | −2.31 | 74.78 | " |

TABLE XI-continued

| Time (min) | (GMS Formulation) Y.I | W.I. | | (our material) Y.I. | W.I. | |
|---|---|---|---|---|---|---|
| 12 | −1.48 | 73.58 | " | −0.70 | 72.15 | " |
| 16 | 4.51 | 58.35 | " | 2.28 | 62.83 | " |
| 20 | 17.56 | 21.43 | " | 6.81 | 50.69 | " |
| 24 | 46.4 | −38.80 | brown | 13.89 | 28.96 | yellow |

EXAMPLE 14

As comparison, the formulation in Example 6, with fully esterified epoxidized fatty esters were tested against a control formulation with GMS. The results are shown in Table XII.

TABLE XII

| Compound Tested | Increase in Term Stability Over Control (min) |
|---|---|
| Epoxidized Soybean Oil (triglyceride) | 1.50 |
| 1,4 butanediol di(epoxidized soya acid ester) | 0.00 |
| methyl epoxidized soya acid ester | 1.00 |

EXAMPLE 15

The following bottle formulation was evaluated employing a commercial mixed metal (Group II metal carboxylate) stabilizer;

| Formulation: | PVC | 100.00 | Test Conditions: | 190° C. |
|---|---|---|---|---|
| Metalblen ® | C201 | 15.00 | | 60 rpm |
| Metalblen ® | P550 | 1.50 | | 62 g |
| Metalblen ® | P710 | 1.00 | | |
| | AC629 | 0.15 | | |
| Vikoflex ® | V7170 | 5.00 | | |
| Mark ® | 557B | 0.20 | | |
| | GMS | 1.50 | | |

Replacing GMS with Example 4, partial ester in the above formulation resulted in a 5.0 min improvement in terms stability. In the same formulation replacing V7170 epoxidized soybean oil (ESO) with the product of Example 4 results in 3.5 min improvement in term stability. Replacement of both GMS and ESO in the above formulation with product of Example 4 (6.5 phr) results in a 6.5 min improvement in term stability.

EXAMPLE 16

The following formulation useful to make bottles was evaluated:

| Formulation: | PVC | 100.00 |
|---|---|---|
| Metablen ® | C201 | 8.0 |
| Metablen ® | P550 | 1.5 |
| | AC629A | 0.15 |
| | Zn Octoate | 0.10 |
| | Ca Stearate | 0.30 |
| | DHP 507[1] | 0.15 |
| | Caster Wax | 1.25 |
| | GMS | 0.30 |
| | V7170 (epoxidized soybean oil) | 5.00 |

[1]Atochem SA

Replacing GMS and 1.0 phr of the ESO with 1.50 phr of product of Example 4 resulted in an increase of 3.0 min in term stability.

EXAMPLE 17

The following formulation is useful for calendaring:

| Formulation: | PVC | 100.00 | Test Conditions | 190° C. |
|---|---|---|---|---|
| | AC629 | 0.10 | | 60 rpm |
| Metablen ® | P550 | 2.00 | | 62 g |
| Metablen ® | C201 | 12.00 | | |
| Thermolite ® | T108 | 1.70 | | |
| | Toner | 0.02 | | |
| | GMS | 1.20 | | |
| Loxiol ® | G70S | 0.20 | | |

In this formulation is useful for calendaring:

| Formulation: | PVC | 100.00 | Test Conditions | 190° C. |
|---|---|---|---|---|
| | AC629 | 0.10 | | 60 rpm |
| Metablen ® | P550 | 2.00 | | 62 g |
| Metablen ® | C201 | 12.00 | | |
| Thermolite ® | T108 | 1.70 | | |
| | Toner | 0.02 | | |
| | GMS | 1.20 | | |
| Loxiol ® | G70S | 0.20 | | |

In this formulation GMS was replaced by the partial ester product of Example 4 or Example 5 at the same level of 1.2 phr. Table XIII illustrates the use of the product of Example 4 as a direct replacement for GMS. The term stability performance is evaluated in terms of the hydroxy to ester ratio.

TABLE XIII

| Hydroxy/Ester Ratio | Increase in Term Stability Over Control (min) |
|---|---|
| 0.55:1 | 4.0 |
| 0.68:1 | 3.5 |
| 0.70:1 | 2.5 |
| 1.00:1 | 5.0 |
| 1.50:1 | 3.7 |
| 0:1 | 1.0 |

EXAMPLE 18

Using the formulation in Example 15, the monoester of epoxidized soya acid and 1,2 propanediol (Example 1) was evaluated. The results are given in Table XV. The control is GMS at 1.2 phr. The increase in term stability over control was 6.5 minutes. The long term color change is given in Table XIV.

TABLE XIV

| Time (min) | GMS Control YI | WI | | Product of Example 1 YI | WI | |
|---|---|---|---|---|---|---|
| 4 | −5.13 | 82.0 | blue/white | −3.53 | 78.83 | blue/white |
| 8 | −4.01 | 80.5 | ↓ | −1.99 | 74.62 | ↓ |
| 12 | −2.98 | 77.9 | ↓ | −1.27 | 72.91 | ↓ |
| 16 | −1.33 | 71.97 | ↓ | 0.24 | 68.77 | ↓ |
| 20 | 1.94 | 62.64 | ↓ | 2.35 | 62.21 | ↓ |
| 24 | 6.84 | 48.60 | ↓ | 5.32 | 54.85 | ↓ |
| 28 | 17.57 | 20.11 | ↓ | 9.27 | 41.61 | ↓ |

TABLE XIV-continued

| Time (min) | GMS Control YI | GMS Control WI | | Product of Example 1 YI | Product of Example 1 WI | |
|---|---|---|---|---|---|---|
| 32 | 33.28 | −16.35 | ↓ | 14.09 | 28.43 | ↓ |
| 36 | 56.5 | −56.37 | ↓ | 21.43 | 8.80 | ↓ |
| 40 | 78.74 | −69.64 | brown | 29.72 | −11.64 | yellow |

EXAMPLE 19

As a comparison, the formulation in Example 15 evaluated the partial ester of pentaerthritol and epoxidized soya acid (Example 1) in lace of GMS. The results are given in Table XV. The control is a GMS 1.2 phr formulation.

TABLE XV

| Concentration (phr) | Increase in Term Stability Over Control (min) |
|---|---|
| 1.2 | −1.0 |

EXAMPLE 20

Following is an example of a formulation useful to make extruded pipe:

| Formulation: | PVC | 100.00 | Test Conditions | 200° C. |
|---|---|---|---|---|
| | TiO₂ | 1.00 | | 60 rpm |
| | CaCO₃ | 4.00 | | 62 g |
| | CaSt | 0.60 | | |
| | XL165 | 1.00 | | |
| | AC629A | 0.10 | | |
| Thermolite ® | T176 | 0.40 | | |

Employing the formulation above 1.5 phr of the partial ester product of Example 4 was added and the term stability of the two formulations compared. The results are given in Table XVII.

TABLE XVI

| PHR Example 4 Product | Term Stability (min) |
|---|---|
| 0.0 | 9.00 |
| 1.5 | 14.00 |

EXAMPLE 21 the following formulation is useful to make siding:

| Formulation: | PVC | 100.00 | Test Conditions | 190° C. |
|---|---|---|---|---|
| | TiO₂ | 10.00 | | 75 rpm |
| Durastrength ® | D200 | 5.00 | | 65 g |
| Metalblen ® | P501 | 1.00 | | |
| | CaSt | 2.00 | | |
| | XL165 | 1.00 | | |
| Thermolite ® | T340 | 1.20 | | |

Employing the formulation above 1.5 phr of product of Example 4 were added and the term stability of the two formulations compared. The results are given in Table XVII.

TABLE XVII

| phr Example 4 | Term Stability (min) |
|---|---|
| 0.0 | 33.7 |
| 1.5 | 38.6 |

EXAMPLE 22

The level of the tin stabilizer in the composition of Example 21 was decreased to 0.85 phr and product of Example 4 is added to the formulation. The results are shown in Table VIII.

TABLE VIII

| PHR of Thermolite ® T-340 | PHR of Partial Ester (Ex. 4) | Term Stability (min) |
|---|---|---|
| 1.20 | 0.0 | 27.5 |
| 0.85 | 1.0 | 30.0 |

EXAMPLE 23

A similar experiment to Example 22 used the same composition as Example 21 and 22 with the partial ester of Example 5. The data is shown in Table XX.

TABLE XIX

| PHR of T-340 | PHR of Example 5 | Term Stability |
|---|---|---|
| 1.20 | 0.0 | 25.0 |
| 0.85 | 1.0 | 30.0 |

EXAMPLE 24

Using the formulation of Example 21, a number of organotin mercaptide stabilizers were tested. The results are given in Table XX. The control in each case is a formulation containing the corresponding stabilizer and no GMS.

TABLE XX

| Stabilizer | Increase in Term Stability (min) |
|---|---|
| Thermolite ® T340 | 6.5 |
| Thermolite ® CN10302 | 3.0 |

EXAMPLE 25

Using the formulation in Example 7, samples of the mono epoxy soya acid ester of 1,2 propanediol (Example 1) and of 1,2 butanediol from methyl epoxy soyate and diol (Example 1) were tested and the results were examined as a function of ester molar content on the two possible carbons. In this Example GMS is replaced with 1.5 phr of the material to be evaluated. The control is a formulation with 1.5 phr of GMS. The results are shown in Table XXI. The molar concentration of each ester species was determined by $^{13}C$ NMR.

TABLE XXI

| Concentration Mono ester (% mol) Carbon #1 | Concentration Mono ester (% mol) Carbon #2 | Conc. Diester (% mol) | Increase in Term Stability Over Control (min) |
|---|---|---|---|
| 1,2 propanediol product | | | |
| 42.7 | 24.0 | 3.3 | 6.7 |
| 61.0 | 31.5 | 7.5 | 10.0 |
| 1,2 butanediol product | | | |
| 37.0 | 18.0 | 45.0 | 5.5 |

TABLE XXI-continued

| Concentration Mono ester (% mol) | | Conc. Diester (% mol) | Increase in Term Stability Over Control (min) |
|---|---|---|---|
| Carbon #1 | Carbon #2 | | |
| 64.0 | 30.9 | 5.1 | 8.0 |

These results demonstrate that the mono ester content affects the degree of term stability improvement.

EXAMPLE 26

The thermal stability of the various materials was determined via standard TGA (Thermal Gravimetric Analysis) methods in air. Table XXII illustrates the data and correlating thermal behavior with performance in terms of term stability increases. The data were obtained from the Brabender ® curves using the formulation of Example 7.

TABLE XXII

| Mono Ester of Epoxy Soya Acid and Polyol | Increase in Term Stability (min) over GMS (for every run) | Start of Wt loss (°C.) |
|---|---|---|
| 1,2 ethanediol | 1.0 | 62 |
| 1,3 butanediol | 0.5 | 50 |
| 1,3 propanediol | 0.5 | 30 |
| 2,3 butanediol | 2.5 | 30 |
| neopentyl diol | 0.5 | 30 |
| mannitol | 0.5 | 30 |
| pentaerythritol | 0.0-2.2 | above 200 |
| sorbitol | 1.5 | above 200 |
| glycerol | 6.0 | 190 |
| 1,2 propanediol | 7.0 | 135-175 |
| 1,2 butanediol | 5.5 | 175 |
| OTHER MATERIALS | | |
| ESO | 1.5 | above 200 |
| methyl epoxidized soya ester | 1.0 | above 200 |

Thus acceptable performance requires decomposition (transformation) of the product in the temperature range of 135° to 190° C.

EXAMPLE 27

The following formulations illustrate compositions containing Ca/Zn combined with the partial ester of Example 5.

| Formulation (Control) | | A | B |
|---|---|---|---|
| PVC | | 100.00 | 100 | 100 |
| Thermolite ® | DM9802 | 1.00 | 0.80 | 0.70 |
| Metalblen ® | C201 | 10.00 | 10.00 | 10.00 |
| Loxiol ® | G70 | 0.50 | 0.50 | 0.50 |
| Metalblen ® | P550 | 2.00 | 2.00 | 2.00 |
| Loxiol | 7111 | 1.50 | — | — |
| Partial ester | | — | 1.50 | 1.50 |
| Calcium Stearate | | — | 0.10 | 0.10 |
| Zinc Stearate | | — | 0.05 | 0.05 |

In the control formulation Loxiol 7111 was replaced with 1.5 phr of product of Example 5, 0.05 phr of zinc stearate and 0.10 phr of calcium stearate. The stabilizer level (DM9802) was reduced 20% (Formulation A) and 30% (Formulation B). The performance was evaluated via Brabender ® chips (198° C. 60 rpm and 62 grams) as previously described. The results are given in terms of YI (Yellowness Index).

| Time (min) | Control (YI) | |
|---|---|---|
| | | Formulation A (YI) |
| 2 | 19.28 | 13.67 |
| 4 | 36.00 | 17.31 |
| 6 | 48.03 | 24.50 |
| 8 | 60.24 | 36.23 |
| 10 | 73.56 | 57.88 |
| 13 | 106.20 | 91.36 |
| | | Formulation B (YI) |
| 2 | 15.39 | 15.96 |
| 4 | 29.02 | 18.56 |
| 6 | 42.31 | 29.02 |
| 8 | 55.46 | 46.10 |
| 10 | 68.52 | 70.28 |
| 13 | 104.87 | 104.86 |

The Example illustrates that product of Example 5 in combination with zinc and calcium carboxylate esters provide further performance improvements (early, mid and term color) at reduced tin levels as compared to the full tin control formulation with Loxiol ® 7111.

Using the above formulation the following changes were made for comparative purposes. Formulation C: 20% reduction in the tin stabilizer (Thermolite ® DM9802) and Loxiol ® 7111 was used at 1.5 hr (no partial ester); Formulation D: same as C but Loxiol ® 7111 was replaced with GMS at 1.5 phr (no partial ester); Formulation E: same as A (with partial ester) plus addition of 0.05 phr 1,2 propanediol; Formulation F: same as D (no partial ester) plus the addition of 0.05 phr of 1,2 propanediol. All formulations, C through F, contained 0.05 phr of zinc stearate and 0.10 phr of calcium stearate. The results are given below:

| | | YI | | | |
|---|---|---|---|---|---|
| Time | Control | C | D | E | F |
| 2 | 14.35 | 14.78 | 14.84 | 15.57 | 13.43 |
| 4 | 29.53 | 18.44 | 18.41 | 21.05 | 17.70 |
| 6 | 41.65 | 30.85 | 28.39 | 30.00 | 31.18 |
| 8 | 57.58 | 53.36 | 50.72 | 44.45 | 50.73 |
| 10 | 73.38 | 103.41 | 89.99 | 64.35 | 102.48 |
| 13 | 99.82 | | | 92.40 | |

The zinc carboxylate-calcium carboxylate system, in the presence of Loxiol ® 7111 or GMS, improves early color performance but severely reduces term stability whereas the partial ester product (Example 5) maintained the term stability characteristics. Addition of 1,2 propanediol in small amounts counteracts the term performance improvement.

EXAMPLE 28

The above Example 27 illustrated the advantage of using Group II metal carboxylates at the constant ratio of 0.05 phr/0.10 phr in combination with the partial ester. Other ratios of the metal carboxylates were also investigated in order to determine the most preferred range. The following formulations illustrate this point.

| Formulation | Control | Formulation A |
|---|---|---|
| PVC | 100.00 | 100.00 |
| AC629 | 0.10 | 0.10 |
| P550 | 2.00 | 2.00 |
| C201 | 12.00 | 12.00 |
| T108 | 1.70 | 1.36 |
| G70S | 0.20 | 0.20 |
| GMS | 1.50 | |
| Example 5 | | 1.50 |

-continued

| Formulation | Control | Formulation A |
|---|---|---|
| ZnSt | | Varied |
| CaSt | | Varied |

The amount of ZnSt (zinc stearate) and CaSt (calcium stearate) were varied and the performance was determined from the YI values of the Brabender® chips. The results are given below:

| | | YI | | | | |
|---|---|---|---|---|---|---|
| | | Zn Stearate/Ca Stearate | | | | |
| Time (min) | Control Ratio ZnSt CaSt | .05/.10 0.5 | .08/.20 0.4 | .05/.15 0.33 | .03/.15 0.15 | .05/.05 1.0 |
| 2 | 10.96 | 13.29 | 15.42 | 16.38 | 16.75 | 10.38 |
| 4 | 19.90 | 16.90 | 16.69 | 21.63 | 22.40 | 12.37 |
| 6 | 25.62 | 19.70 | 20.22 | 27.13 | 27.65 | 13.85 |
| 8 | 31.99 | 25.90 | 23.24 | 33.14 | 35.71 | 17.40 |
| 10 | 36.92 | 29.91 | 27.49 | 37.28 | 43.71 | 20.76 |
| 15 | 51.75 | 51.30 | 47.84 | 57.35 | 66.69 | Black |

Optimum performance was obtained for the 0.4 to 0.7 ratio. Most preferred in a number of formulations was the 0.5 ratio (ZnSt/CaSt: 0.05/0.10). Addition of ZnSt exclusively improved the color of the chips at 2 and 4 min, but catastrophic degradation (black color) occurred soon after.

EXAMPLE 29

The Example below illustrates the use of the Example 4 product (partial ester of glycerol and ESO) in regrind applications. In this Example a typical bottle formulation (Example 7) containing GMS was blown into bottles employing a blow molding machine. The bottles were then ground into fine powder and combined with virgin formulation (no heat history) in the proportion of 35% ground material and 65% virgin material. In the control both ground material and virgin contain GMS at 1.5 phr. The sample (Example 4) and 35% ground material containing GMS and 65% virgin in which the GMS was directly replaced with product of Example 4 at 1.5 phr. The new blends were then evaluated on the Brabender® chips via YI values.

| Time | Control (YI) | Product Ex. 4 (YI) |
|---|---|---|
| 2 | −6.74 | −7.99 |
| 6 | 0.05 | 1.47 |
| 8 | 11.59 | 11.92 |
| 10 | 22.90 | 19.30 |
| 12 | 31.90 | 28.65 |
| 14 | 46.35 | 37.66 |
| 16 | 61.23 | 44.33 |
| 18 | 83.69 | 59.42 |
| 20 | black | 69.84 |
| 22 | | 82.87 |
| 24 | | 86.97 |

The Example illustrates that the use of the partial ester improves intermediate color (lower Yi values) and significantly extends term color.

EXAMPLE 30

This Example illustrates the performance of the partial ester products of glyceryl (Example 3) and 1,2-propanediol (Example 2) with epoxidized methyl oleate and methyl linoleate using the formulation and test method as described for Example 7. As in Example 7, GMS was replaced with a corresponding amount (1.5 phr) of the test material and the increase in term stability measured over the GMS control.

| | Increase in Term Stability Over Control (min) | % Oxirane |
|---|---|---|
| glyceryl mono/di epoxidized oleate | 5.5 | 4.3 |
| glycerly mono di epoxidized linoleate | 4.5 | 7.2 |
| propylene glycol mono epoxidized linoleate | 5.5 | 8.05 |
| propylene glycol mono epoxidized oleate (2 to 1 molar ratio) | 5.5 | 4.68 |

As evident from the data no significant performance difference is observed between the samples, although the oxirane content differed appreciably. This demonstrates that the performance is not significantly influenced within the prescribed oxirane concentration units.

EXAMPLE 31

This Example illustrates the performance improvement (enhancement) to a composition when polyvinyl alcohol is added to the partial ester (Example 5) and calcium and zinc stearates. The composition and results are summarized below. The usage of the tin stabilizer could be reduced by

| Formulation | Control | Example 31A | 31B |
|---|---|---|---|
| PVC | 100 | 100 | 100 |
| Thermolite® T890 | 1.5 | 1.3 | 1.3 |
| AC629A | 0.1 | 0.1 | |
| Metalblen® C201 | 14.0 | 14.0 | 14.0 |
| Metalblen® P550 | 2.0 | 2.0 | 2.0 |
| Toner | 0.02 | 0.02 | 0.02 |
| GMS | 1.5 | — | — |
| Partial Ester | | 1.5 | 1.5 |
| ZnSt | | 0.05 | 0.05 |
| CaSt | | 0.10 | 0.10 |
| Poly(vinyl alcohol) | | 0.10 | — |

| Color Chips Control Time (min) | Control | Example 31A | 31B |
|---|---|---|---|
| 2 | blue/white | bright blue/white | bright blue/white |
| 4 | blue/gray | bright blue/white | bright blue/white |
| 6 | blue/gray/yellow | blue/white | blue/white |
| 8 | gray/yellow | light green | light/green |
| 10 | dark gray | green | green |
| 15 | deep green | deep green | deep green |
| 20 | light brown | light brown | black |
| 23 | dark brown | reddish brown | |

EXAMPLE 32

Example 5 as described in JP 75-143456 was repeated where the products of the present invention were substituted for one of the products of that patent. A dioctyltin maleate ester stabilizer was used according to the reference Example. No improvement of stabilization was evident when using the products glycerine or 1,2 propandiol and ESO.

| Formulation: | PVC | 100.00 |
|---|---|---|
| | Dioctyl tin Bis(butylmaleate) | 1.50 |
| | Stearic acid | 0.50 |
| | Polyol partial ester | 1.00 |
| Reaction Product of | | Term Stability (min) |

| -continued | |
|---|---|
| None | 12.2 |
| Glycerin + ESO | 11.8 |
| Propanediol + ESO | 12.7 |

While exemplary embodiments of the invention have been described, the true scope of the invention is to be determined from the following claims.

What is claimed is:

1. A partially esterified polyhydroxyl containing compound derived from the reaction of:
   an oxirane compound selected from the group consisting of epoxidized vegetable oil and ester derivatives thereof, epoxidized fish oil and ester derivatives thereof, and an aliphatic or arylaliphatic carboxyl group containing compound having at least one oxirane group in the aliphatic chain where the aliphatic chain has at least four carbons;
   a polyhydroxyl containing compound selected from the group consisting of aliphatic diols, triols, di-diols and 1,4-dihydroxy butane based compound;
   wherein the partially esterified polyhydroxyl compound exhibits a thermal change between 135° C. and 200° C. as measured by Thermal Gravimetric Analysis.

2. The compound as recited in claim 1 wherein:
   the diol is selected from a 1,2-dihydroxy alkane compound and a 1,4-dihydroxy butane compound;
   the triol has at least one primary and one adjacent, secondary hydroxyl;
   the di-diols consist of two primary and adjacent secondary hydroxyl pairs separated by from two to four methylene groups; and
   the oxirane compound contains at least 12 but no more than 28 carbons.

3. The compound as recited in claim wherein the polyhydroxyl containing compound is selected from the group consisting of aliphatic diols and 1,4-hydroxyl butane.

4. The compound as recited in claim 1 wherein the polyhydroxyl containing compound is selected from the group consisting of aliphatic triols and di-diols.

5. The compound as recited in claim 4 wherein the triol is glycerol

6. The compound as recited in claim 1 wherein the reaction is conducted under substantially anhydrous conditions.

7. The compound as recited in claim 1 having an oxirane content of at least three weight percent.

8. A partially esterified compound derived from the anhydrous transesterification or transalcoholysis reaction of:
   an oxirane compound selected from the group consisting of epoxidized vegetable oil, epoxidized fish oil, and epoxidized compounds having the formula $$R^2 \left[ \begin{matrix} O \\ \| \\ OC(CH_2)_yC \end{matrix} \overset{O}{\diagup \diagdown} CR^1 \right]_n$$

wherein,
y=2 to 24,
n=1-2

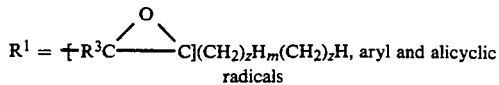
$R^1 = \{R^3C \overset{O}{\diagup \diagdown} C\}(CH_2)_zH_m(CH_2)_zH$, aryl and alicyclic radicals m=0 to 2
z=1 to 23

$R^2 = \{CH^2\}_sH, CH_3CHCH_3$;

when n = 2, $R^2 = \overset{|}{C}H_2\overset{|}{C}HCH_3, \overset{|}{C}H_2(CH_2)_2\overset{|}{C}H_2, \overset{|}{C}H_2\overset{|}{C}HCH_2OCH_3$ s=1–3
$R^3=(CH_2)_o$, and
o=2 to 8,
a polyhydroxyl compound selected from the group consisting of aliphatic diols, triols, di-diols and 1,4-dihydroxy butane compounds;
wherein the partially esterified polyhydroxyl compound exhibit a thermal change between 135° C. and 200° C. as measured by Thermal Gravimetric Analysis.

9. The compound as recited in claim 8 wherein the oxirane compound is selected from epoxidized vegetable oil, and epoxidized fish oil.

10. The compound as recited in claim 8 wherein the oxirane compound is selected from the following epoxidized vegetable oils; soybean, linseed, corn, sunflower, safflower, rapeseed, peanut, and cottonseed.

11. The compound as recited in claim 8 wherein
y=7 to 11;
m=1 to 2; and
o=2 to 4.

12. The compound as recited in claim 8 wherein:
   the diol is selected from a 1,2-dihydroxy compound and a 4-dihydroxy butane compound;
   the triol has at least one primary and one adjacent, secondary hydroxyl;
   the di-diols consist of two primary and adjacent secondary hydroxyl pairs separated by from two to four methylene groups; and
   the carboxyl compound contains at least 12 but no more than 28 carbons.

13. The compound as recited in claim 8 wherein the polyhydroxyl compound is selected from the group consisting of 1,2-propanediol, 1,2-butane diol, 1,2 hexanediol, 1,2-dihydroxy, 4-methoxy butane, 1,2-dihydroxy,3-methoxy propane, glycerol, 1,2,4-trihydroxy butane, 1,2-dihydroxy-3-proyl-oxyethanol, 1,2-plentane diol, 1,2-dihydroxy-3-propyl-3-oxypropanol-1, 1,2,5-trihydroxypentane, 1,2,6-trihydroxy hexane, 1,4-dihydroxy butane, 1,2-dihydroxy propyloxy, and 1',1'-dihydroxy propane.

14. The composition as recited in claim 8 derived from the reaction of epoxidized vegetable oil and glycerol.

15. The composition as recited in claim 8 wherein the polyhydroxyl containing compound is selected from the group consisting of aliphatic diols and 1,4-hydroxyl butane.

16. The composition as recited in claim 8 wherein the polyhydroxyl containing compound is selected from the group consisting of aliphatic triols and di-diols.

17. The composition as recited in claim 8 wherein the triol is glycerol

18. The composition as recited in claim 8 wherein the reaction is conducted under substantially anhydrous conditions.

19. The compound as recited in claim 8 wherein the ratio of esterified hydroxyl to free hydroxyl groups of the diol, triol or di-diol is from 1:2 to 2:1.

20. A process for anhydrous transesterification or transalcoholysis of polyhydroxyl containing compounds and epoxide oils/esters comprising:

partially esterifying a polyhydroxyl containing compound selected from the group consisting of aliphatic diols, triols, di-diols and 1,4-dihydroxy butane with an oxirane compound selected from the group consisting of epoxidized vegetable oil and ester derivatives thereof, epoxidized fish oil and ester derivatives thereof, and an aliphatic or arylaliphatic carboxyl group containing compound having at least one oxirane group in the aliphatic chain where the aliphatic chain has at least four carbons, under substantially anhydrous conditions; wherein the partially esterified polyhydroxyl compound exhibits a thermal change between 135° C. and 200° C. as measured by Thermal Gravimetric Analysis.

21. The process of claim 20 where the partially esterified polyhydroxyl compound is glycerol monoepoxy soyate (GMES).

22. The process of claim 20 where the partially esterified polyhydroxyl compound is propylene glycol/glycerol monoepoxy soyate (PGMES).

* * * * *

UNITED STATES PATENT AND TRADEMARK OFFICE
CERTIFICATE OF CORRECTION

PATENT NO. : 5,324,846
DATED : June 28, 1994
INVENTOR(S) : Hirshman, et al.

It is certified that error appears in the above-indentified patent and that said Letters Patent is hereby corrected as shown below:

Column 3, line 3, "1;2" should read --1:2--

Column 3, line 26, "H,m'" should read --H,m--

Column 16, line 29, "toreduce" should read --to reduce--

Column 16, line 44, "partialester" should read --partial ester--

Column 21, line 14, "lace" should read --place--

Column 27, line 38, after "claim" insert --1--

Signed and Sealed this

Thirteenth Day of September, 1994

Attest:

BRUCE LEHMAN

Attesting Officer    Commissioner of Patents and Trademarks